No. 636,114. Patented Oct. 31, 1899.
J. S. CAIN, A. SODERLING & S. P. MacKNIGHT.
PRELIMINARY TREATMENT OF ORES OR TAILINGS BEFORE CYANIDING.
(Application filed Jan. 13, 1898.)
(No Model.) 2 Sheets—Sheet 1.
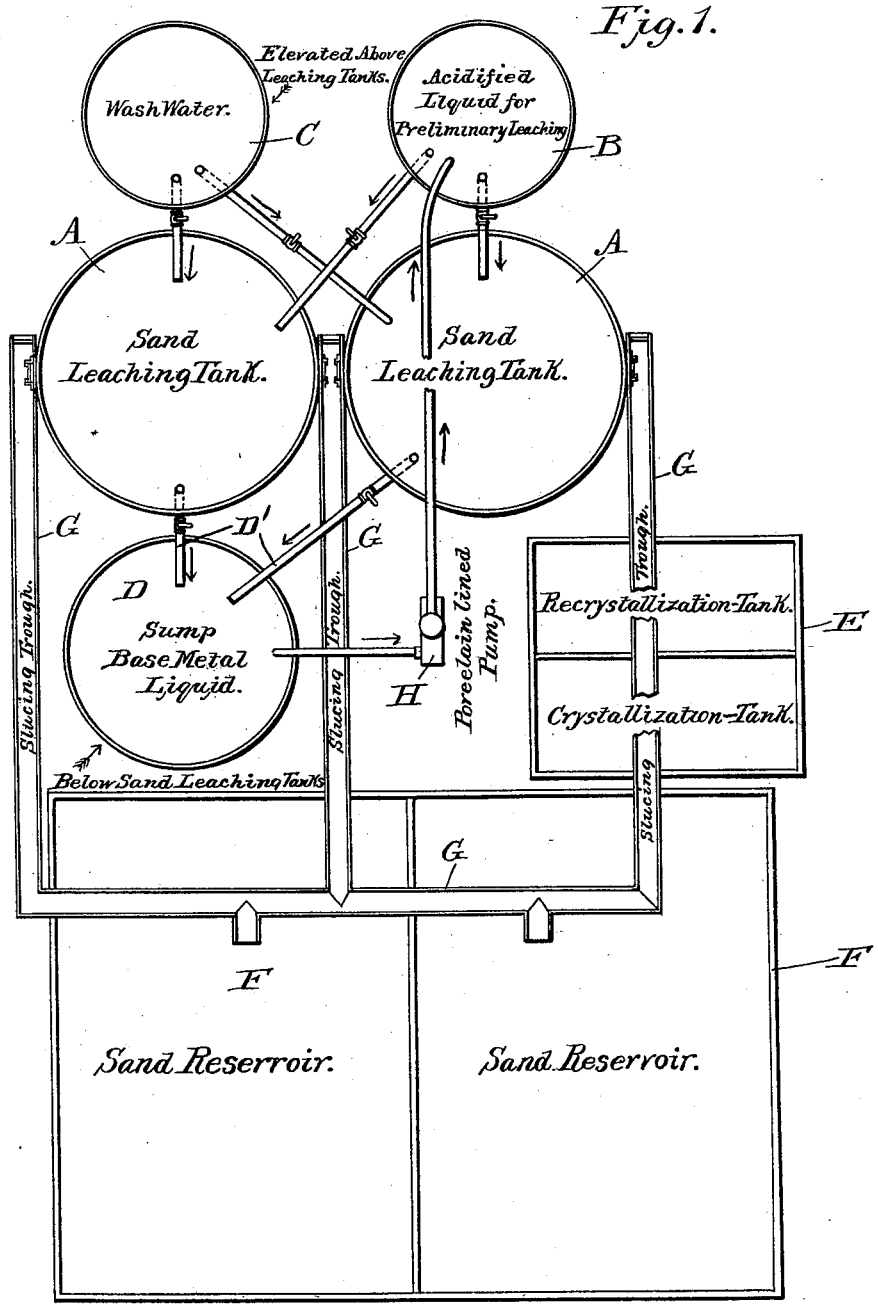

No. 636,114. Patented Oct. 31, 1899.
J. S. CAIN, A. SODERLING & S. P. MacKNIGHT.
PRELIMINARY TREATMENT OF ORES OR TAILINGS BEFORE CYANIDING.
(Application filed Jan. 13, 1898.)
(No Model.) 2 Sheets—Sheet 2.
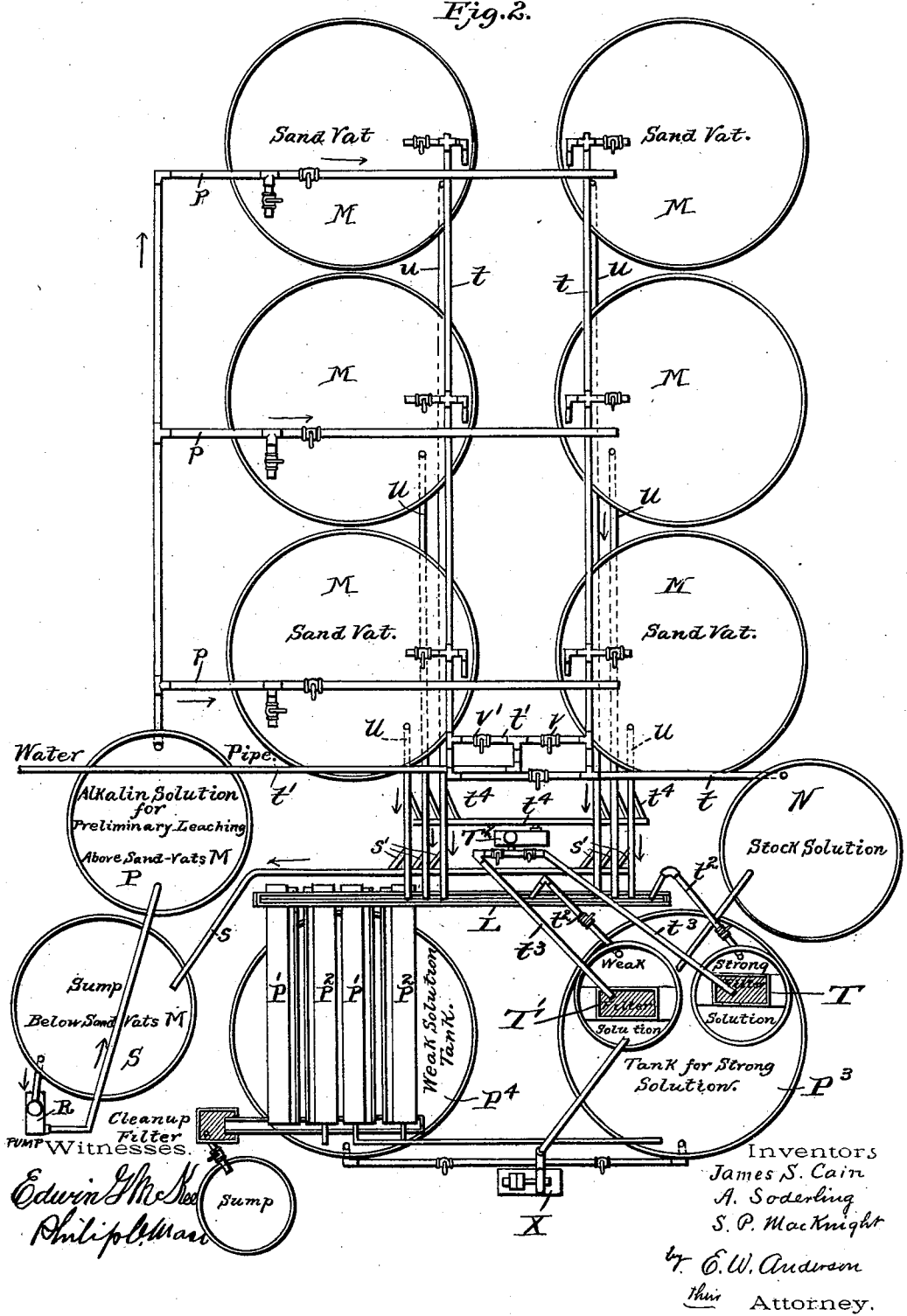

UNITED STATES PATENT OFFICE.

JAMES STUART CAIN AND AUGUST SODERLING, OF BODIE, AND SMITH PECK MacKNIGHT, OF BISHOP, CALIFORNIA.

PRELIMINARY TREATMENT OF ORES OR TAILINGS BEFORE CYANIDING.

SPECIFICATION forming part of Letters Patent No. 636,114, dated October 31, 1899.

Application filed January 13, 1898. Serial No. 666,572. (No specimens.)

*To all whom it may concern:*

Be it known that we, JAMES STUART CAIN and AUGUST SODERLING, residents of Bodie, in the county of Mono, and SMITH PECK MAC-KNIGHT, a resident of Bishop, county of Inyo, State of California, have invented certain new and useful Improvements in a Preliminary Treatment of Ores or Tailings Before Cyaniding; and we do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a plan view showing, on conventional form, apparatus for carrying out one part of our invention; and Fig. 2 is a similar view showing an ordinary plant for the cyanid treatment of ores with certain adjuncts or attachments for carrying out the second part of the invention.

Our invention has relation to certain new and useful improvements in the cyanid treatment of ores and tailings containing the precious metals; and it consists in certain preliminary treatments of the same whereby the cyanid treatment may be subsequently carried out more fully, effectively, and economically, all as hereinafter described and claimed.

Our improvement consists in leaching the ores or tailings in a weak solution of any or all of the mineral acids, principally sulfuric acid ($H_2SO_4$) and nitric acid, ($HNO_3$,) for the purpose of removing therefrom the elements contained therein which are destructive to the potassium cyanid to be used in the subsequent treatment. The tailings after being treated with the acid solution are washed with water until free from mineral acid and are then subjected to a treatment with a weak solution of an alkali. The alkali used is usually crude potassium hydrate (KOH) or sodium hydrate (NaOH) or sodium or potassium carbonates, ($K_2CO_3$ or $Na_2CO_3$.) In many cases lime-water can be used where the amount of alkali required is small. The alkali solution is run on in just sufficient quantity to neutralize the latent acidity of the tailings, after which the tailings are treated with cyanid solution direct in the usual way, as hereinafter described.

The treatment with the weak acid solution results in a saving of the consumption of cyanid by reason of its dissolving from the ores or tailings many elements—such as copper salts and basic iron salts, &c.—which have a decomposing effect upon the potassium cyanid.

The use of nitric acid has a beneficial effect in oxidizing many compounds in the ore which would otherwise interfere with the action of the cyanid by robbing the water used in the solution of much of its absorbed oxygen, and thereby eliminating to a great extent one of the necessary elements in the reaction of cyanid of potassium upon gold.

The nitric acid has no effect in directly dissolving silver from ores on account of its highly-diluted state, the only possible cases being highly disintegrated and porous carbonates, in which case the action may be retarded completely by having in the acid solution a very small portion of sodium chlorid or hydrochloric acid, which will render all silver salts highly insoluble in acids and will yet leave them in the best possible condition to be acted upon by potassium cyanid.

In the accompanying drawings, Fig. 1, we have shown in general form suitable apparatus for carrying out this part of our invention. In this figure the letters A A designate the leaching-tanks, in which the acid treatment is carried on. B is a tank containing the acidified leaching solution. C is a wash-water tank. D is a tank or sump for the base-metal liquid. E is a double crystallization and recrystallization tank. F F are sand-reservoirs. G is a system of sluicing-tanks, and H is a porcelain-lined pump for returning the mother-liquid from the tank or sump D to the tank B. The purpose of the several connecting-pipes shown will be apparent from the drawings without detailed description thereof. The tanks B and C should be elevated somewhat above the sand leaching-tanks A A, and the tank D should be below the level of the said leaching-tanks.

The preliminary acid treatment is beneficial not only to remove copper contained in the ores or tailings, but also to give a higher extraction of both gold and silver, particularly of the latter, which is then acted upon by potassium cyanid as rapidly as the gold.

In carrying out the treatment of the ores, tailings, &c., they are leached from one to two days with from one one-hundredth to ten per cent. solution of nitric acid or sulfuric acid, as each material may require, or of both. The treatment requires about one-third the number of tanks used in an ordinary cyanid plant, and the time required is less than one-half of that required for the subsequent cyanid treatment. The sands, ores, tailings, &c., after being thus leached and thoroughly washed with water are shoveled or sluiced out and into the cyanid leaching-vats or into reservoirs, the air by the manipulation having free access to the material, thereby greatly increasing the extracting power of the potassium cyanid for gold and silver to as great an extent as by the use of the suction-pumps commonly used in ordinary cyanid plants, Fig. 2, to drain off the cyanid solution, and thus by atmospheric pressure force air down into the vats containing the sand or tailings, air and cyanid being thereby alternately admitted to the tailings. In ores or tailings containing much copper the sulfuric-acid wash dissolves out all such copper compounds or copper salts as would otherwise be attacked by the subsequent cyanid solution. This solution of sulfate of copper is carried in a system of lead pipes or hose from the acid leaching-tanks (marked A) to a series of shallow tanks or concrete reservoirs, one of which is shown at D. As the water evaporates the sulfate of copper crystals which accumulate can be separated from the mother-liquid and transferred to the tank E, or the copper may be precipitated by metallic iron. Instead of shoveling the charges of tailings, &c., from the tanks A sluicing is much cheaper where water is plentiful, in which case the cyanid plant should be erected below the preliminary plant with sufficient fall for dams or reservoirs constructed between the plants to hold the tailings after the treatment with acid, whereby they may be successfully dried out and cultivated with exposure to light and air, which invariably gives a much greater gold and silver extraction by the subsequent treatment and saves to a very great extent the consumption of cyanid of potassium. In this manner ores and tailings, valueless at present on account of too much consumption of cyanid and low degree of extraction, and, in fact, nearly all tailings of too low grade heretofore, can be worked with a good profit. The filters for the leaching-vats should be pebbles, such as are not soluble in acids being preferable, as canvas filters will soon be destroyed unless soaked in paraffin or coaltar or woven from hemp which has been treated with some substance of a similar nature indestructible by acids. The mother-liquid from the tank D can be returned for reuse.

The second step in our improvement consists in using alkaline solutions as a treatment preliminary to the treatment with cyanid rather than simultaneously with the cyanid treatment. This alkaline treatment is to follow the acid treatment. By this treatment certain basic salts are neutralized which would otherwise decompose the cyanid and cause both loss of the same and loss in its extracting power. In carrying out this improvement the ores or the tailings are leached from twelve to forty-eight hours, according to their character, in a solution of caustic lime or of soda, potash, or other alkaline salt before adding the cyanid solution. In using caustic or carbonate of soda or potash their solutions should not exceed five per cent. in strength.

In Fig. 2 of the drawings is shown in general plan an ordinary plant for the cyanid treatment of ores. The explanation of same is as follows: In this figure the tanks N are for containing the sand or tailings to be treated by the process. The sand or tailings are thrown into the tanks by shoveling or by means of automatic carriers or may be dropped in through the slats or false floors of platforms built over the tanks, the sand having been previously dumped upon the platform from wagons or other hauling contrivances. When the tanks are filled with sand, the solution from the "stock-solution" tank N is discharged on the sand by means of pipes $t$, connecting the tanks, such flow being regulated to the proper pipe by means of cocks or valves $v$, as indicated in the plan. The pipes leading to the sand-tanks are so arranged that the stock solution may be made to enter the sand-tank from above or below the sand, as the case may require. After the solution has been in contact with the sand or material being treated the required length of time the cyanid solution now charged with silver and gold is drained from the sand by means of pipes $u$, running from the bottom of the tanks. These pipes terminate in flexible tips, so that the solution may be made to run either side of a double-compartment trough L, such compartments conveying the solution to the weak-solution or strong-solution zinc boxes P or $P^4$, as required. The solution in passing through the zinc boxes has its gold and silver precipitated on the zinc, while the solution still containing some cyanid flows on into the sump-tank $P^3$. When the solution is completely drained from the sand-vats, the sand is further washed by means of fresh water, which is conveyed by means of the water-pipes $t'$ and the pipes $t$, the flow being regulated by the valves $v'$ and $v$. This wash-water flows on top of the sand and washes out the remaining cyanid solution containing value, the wash-water passing out through the pipes $u$, the trough L conveying the solution to the weak-solution zinc boxes $P'$, such solution passing through the zinc boxes and into the solution-tank P⁴. The solution from the sumps P³ P⁴ is pumped into the stock-solution tank N by means of the pump X, as may be required, and strengthened to standard strength by the addition of the cyanid. The sand in the tanks M, Fig. 2, after being treated is removed, fresh material is added, and the process repeated.

T T' designate filters for the strong and weak solutions, respectively, and which are connected by pipes $t^2$ with the respective compartments of the trough L. Said filters are connected by pipes $t^3$ with a pump T', the latter in turn being connected by pipes $t^4$ with the pipes $u$.

For the purpose of carrying out the second step of our improvement we have added to such a plant a tank P for holding the alkaline solution, such tank being located at a higher level than the leaching or sand vats or tanks M, Fig. 2, pipes $p$ being provided for conducting the solution thereto. S, Fig. 2, is a sump or vat which is located below the level of the leaching-vats and is connected with the pipe system $u$ of the ordinary plant by means of the pipes $s$ and branch pipes $s'$.

R, Fig. 2, is a pump for supplying water to the tank A. Tanks S and P, Fig. 2, pump R, and pipes $p\ s\ s'$ are the only additions necessary to the ordinary plant for carrying out this preliminary alkaline treatment.

When caustic lime, caustic soda, caustic potash, or carbonate of potash or of soda are used simultaneously with the potassium cyanid, as heretofore, the latter, being of an alkaline reaction, is destroyed, together with the other before-mentioned alkalies, whenever the acid of the ores or tailings exists in a combined or basic state. If, however, any of either of the above-mentioned alkalies are used to neutralize such latent or basic acidity before any potassium cyanid is added, the cyanid is not then attacked except in dissolving the precious metals. In carrying out this principle the ores or tailings are, as above indicated, leached from twelve to forty-eight hours with a solution of caustic lime, caustic soda, caustic potash, or carbonate of soda or of potash before the solution of potassium cyanid is added. Caustic lime will in most cases be used and a saturated solution employed. The caustic lime is placed in tank P and the saturated solution formed therein. This solution is then supplied to the leaching-vats through the pipes $p$. This alkaline solution is run on the ores or tailings and is leached or pumped through as usual by suction-pumps, whence the solution, now robbed to some extent of its alkaline properties, is conducted to the sump or tank S by way of the pipes $s\ s'$. This sump or tank also contains caustic lime, soda, or other alkali, and when the solution is again saturated it is pumped from the sump and used over again in the leaching-vats, this process being continued until the acidity of the ores or tailings is neutralized.

After the above treatment the cyanid solution may be immediately run on the ores or tailings. It has been found by experiment that very refractory tailings become completely neutralized by forty-eight hours of this preliminary treatment and that many samples of tailings give up their acidity in from twelve to twenty-four hours. It has also been determined by actual experiment that many tailings treated in the ordinary manner with lime and cyanid together consume such an amount of cyanid as to render them unprofitable for working by this method, while as determined by actual experiments and tests carried on by ourselves the same tailings when treated by our improved method can be profitably worked, owing to the higher degree of extraction and the consumption of a much less quantity of cyanid.

Having thus described our invention, what we claim as new, and desire to secure by Letters Patent, is—

1. The herein-described method or process of treating ores, &c., containing the precious metals, which consists in first leaching said ores or tailings in a weak solution of nitric acid, subsequently leaching the same in an alkaline solution, and finally leaching the same in a cyanid solution, substantially as specified.

2. The herein-described method or process of treating ores, &c., containing the precious metals, which consists in first leaching said ores, &c., in a weak solution of principally nitric and sulfuric acids, subsequently leaching the same in an alkaline solution, and finally leaching the same in a cyanid solution, substantially as specified.

In testimony whereof we affix our signatures in presence of two witnesses.

JAMES STUART CAIN.
AUGUST SODERLING.
SMITH PECK MacKNIGHT.

Witnesses as to signatures of James Stuart Cain and August Soderling:
A. LAZARD,
JAS. W. NOYLE.

Witnesses as to the signature of Smith Peck MacKnight:
JOHN A. LEIDY,
HUGH W. NELSON.